(12) United States Patent
Hong et al.

(10) Patent No.: US 12,525,682 B2
(45) Date of Patent: Jan. 13, 2026

(54) BATTERY MODULE INCLUDING FLAME-RETARDANT SHEET, AND BATTERY RACK AND ENERGY STORAGE SYSTEM INCLUDING THE SAME

(71) Applicant: LG ENERGY SOLUTION, LTD., Seoul (KR)

(72) Inventors: Sung-Goen Hong, Daejeon (KR); Seung-Hyun Kim, Daejeon (KR); Young-Seok Lee, Daejeon (KR); Kyung-Hyun Bae, Daejeon (KR); Jin-Kyu Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 826 days.

(21) Appl. No.: 17/771,853

(22) PCT Filed: Jan. 14, 2021

(86) PCT No.: PCT/KR2021/000560
§ 371 (c)(1),
(2) Date: Apr. 26, 2022

(87) PCT Pub. No.: WO2021/145706
PCT Pub. Date: Jul. 22, 2021

(65) Prior Publication Data
US 2022/0367971 A1    Nov. 17, 2022

(30) Foreign Application Priority Data
Jan. 15, 2020    (KR) ........................ 10-2020-0005522

(51) Int. Cl.
*H01M 50/383* (2021.01)
*H01M 50/505* (2021.01)
*H01M 50/536* (2021.01)

(52) U.S. Cl.
CPC ....... *H01M 50/383* (2021.01); *H01M 50/505* (2021.01); *H01M 50/536* (2021.01)

(58) Field of Classification Search
CPC ............. H01M 50/383; H01M 50/505; H01M 50/536; H01M 2220/10; H01M 10/613;
(Continued)

(56) References Cited

U.S. PATENT DOCUMENTS

2005/0110458 A1*  5/2005  Seman, Jr. ............ H01M 50/51
                                                          320/114
2008/0280198 A1   11/2008  Kumar et al.
(Continued)

FOREIGN PATENT DOCUMENTS

CN    105322114 A    2/2016
CN    205488284 U    8/2016
(Continued)

OTHER PUBLICATIONS

International Search Report (PCT/ISA/210) issued in PCT/KR2021/000560 mailed on Apr. 22, 2021.
(Continued)

*Primary Examiner* — Allison Bourke
*Assistant Examiner* — Kayla Elaine Clary
(74) *Attorney, Agent, or Firm* — Birch, Stewart, Kolasch & Birch, LLP

(57) ABSTRACT

A battery module includes at least one cell assembly including a plurality of secondary batteries, each of which has an electrode lead, a module housing having an inner space formed to accommodate the cell assembly therein, a bus bar assembly including at least one electrically conductive bus bar having a plate shape and configured to contact a portion of the electrode lead, and at least one electrically insulating bus bar frame to which the at least one bus bar is mounted, the at least one bus bar frame having a plurality of perforated
(Continued)

holes through which the electrode leads of the plurality of secondary batteries passes and a flame-retardant sheet having a plate shape and located in close contact with an outer side of the bus bar to close the perforated hole.

8 Claims, 8 Drawing Sheets

(58) Field of Classification Search
CPC ............. H01M 10/647; H01M 10/658; H01M 50/507; H01M 50/211; H01M 50/204; H01M 50/24; H01M 10/625; H01M 50/572; H01M 50/502; H01M 2200/00; H01M 10/653; Y02E 60/10
See application file for complete search history.

(56) References Cited

U.S. PATENT DOCUMENTS

| | | | |
|---|---|---|---|
| 2012/0164490 A1* | 6/2012 | Itoi | H01M 50/358 429/82 |
| 2012/0301747 A1* | 11/2012 | Han | H01M 50/256 429/7 |
| 2015/0221914 A1* | 8/2015 | Page | H01M 50/227 429/82 |
| 2016/0036022 A1 | 2/2016 | Tononishi et al. | |
| 2016/0344011 A1* | 11/2016 | Ogawa | H01M 50/209 |
| 2018/0138478 A1 | 5/2018 | Chan | |
| 2018/0194235 A1 | 7/2018 | Kim et al. | |
| 2018/0229621 A1 | 8/2018 | Roh et al. | |
| 2019/0020001 A1 | 1/2019 | Nakano et al. | |
| 2020/0014005 A1 | 1/2020 | Lee et al. | |
| 2020/0035967 A1 | 1/2020 | Yoon et al. | |
| 2022/0181742 A1* | 6/2022 | Mabrey | H01M 50/224 |

FOREIGN PATENT DOCUMENTS

| | | |
|---|---|---|
| CN | 206834265 U | 1/2018 |
| EP | 2 894 695 A2 | 7/2015 |
| EP | 3 460 870 A1 | 3/2019 |
| JP | 2003-317679 A | 11/2003 |
| JP | 2012-113896 A | 6/2012 |
| JP | 5916500 B2 | 6/2016 |
| JP | WO2017/130259 A1 | 11/2018 |
| JP | 2019-500736 A | 1/2019 |
| JP | 2022-528249 A | 6/2022 |
| KR | 10-2017-0034560 A | 3/2017 |
| KR | 10-2017-0098579 A | 8/2017 |
| KR | 10-1911662 B1 | 10/2018 |
| KR | 10-2018-0135604 A | 12/2018 |
| KR | 10-2019-0040403 A | 4/2019 |
| KR | 10-1944826 B1 | 4/2019 |
| KR | 10-2019-0082180 A | 7/2019 |
| KR | 10-2019-0086853 A | 7/2019 |
| KR | 10-2019-0097231 A | 8/2019 |
| KR | 10-2033001 B1 | 10/2019 |

OTHER PUBLICATIONS

Extended European Search Report for European Application No. 21740679.2 dated Sep. 5, 2022.

* cited by examiner

BATTERY MODULE INCLUDING FLAME-RETARDANT SHEET, AND BATTERY RACK AND ENERGY STORAGE SYSTEM INCLUDING THE SAME

TECHNICAL FIELD

The present disclosure relates to a battery module including a flame-retardant sheet, and a battery rack and an energy storage system including the battery module, and more particularly, to a battery pack having a reduced risk of secondary ignition or explosion.

The present application claims priority to Korean Patent Application No. 10-2020-0005522 filed on Jan. 15, 2020 in the Republic of Korea, the disclosures of which are incorporated herein by reference.

BACKGROUND ART

Secondary batteries commercialized at the present include nickel cadmium batteries, nickel hydrogen batteries, nickel zinc batteries, and lithium secondary batteries. Among them, lithium secondary batteries are in the spotlight due to free advantages such as free charging and discharging by little memory effect compared to nickel-based secondary batteries, and very low self-discharge rate and high energy density.

The lithium secondary battery mainly uses a lithium-based oxide and a carbon material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed therebetween, and an exterior, namely a battery pouch exterior, for hermetically storing the electrode assembly together with an electrolyte.

Recently, secondary batteries are widely used not only in small devices such as portable electronic devices, but also in middle-sized or large-sized devices such as vehicles and energy storage systems. When used in the middle-sized or large-sized device, a large number of secondary batteries are electrically connected to increase capacity and output. In particular, pouch-type secondary batteries are widely used in the middle-sized or large-sized devices since they may be easily stacked.

Meanwhile, recently, as the need for a large-capacity structure increases along with the use as an energy storage source, the demand for a battery module including a plurality of secondary batteries electrically connected in series and/or in parallel and a battery management system (BMS) is increasing.

In addition, the battery module generally includes an outer housing made of a metal material to protect or store the plurality of secondary batteries from an external shock. Meanwhile, the demand for high-capacity battery modules is increasing recently.

However, since the conventional battery rack has a plurality of battery modules, if the secondary batteries of each battery module causes ignition or explosion, heat or flame may be transferred to neighboring secondary batteries to cause secondary explosions, so efforts to prevent secondary ignition or explosion are increasing.

Moreover, in order to prevent the fire from spreading to secondary batteries adjacent to the secondary battery where the fire occurs, it is necessary to quickly discharge the generated flame and high-temperature gas to the outside.

Further, in order to quickly extinguish the fire of the ignited secondary battery, it is necessary to develop a technology capable of blocking air so that oxygen is not supplied to the ignited secondary battery.

DISCLOSURE

Technical Problem

The present disclosure is designed to solve the problems of the related art, and therefore the present disclosure is directed to providing a battery module, which reduces the risk of secondary ignition or explosion.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module, comprising:
 at least one cell assembly including a plurality of secondary batteries, each secondary battery of the plurality of secondary batteries having an electrode lead;
 a module housing having an inner space formed to accommodate the cell assembly;
 a bus bar assembly including at least one electrically conductive bus bar having a plate shape and configured to contact a portion of the electrode lead, and at least one electrically insulating bus bar frame to which the at least one bus bar is mounted, the at least one bus bar having a plurality of perforated holes through which the electrode leads of the plurality of secondary batteries passes; and
 a flame-retardant sheet having a plate shape and located in contact with an outer side of the at least one bus bar to close the plurality of perforated holes.

Also, the flame-retardant sheet may have a plurality of welding holes through which a portion of the electrode leads in contact with the at least one bus bar is exposed to the outside.

Moreover, the flame-retardant sheet may have a plurality of ridged portions formed on an inner surface thereof facing the at least one bus bar to be ridged inward, the plurality of ridged portions being shaped to surround an outer circumference of a respective one of the plurality of welding holes.

In addition, the plurality of secondary batteries may be stacked on each other in a front and rear direction and configured to include the electrode leads respectively located at a left end and a right end thereof.

Also, the bus bar assembly may be provided at a left side and a right side of the cell assembly, respectively.

Moreover, the at least one bus bar may have a plurality of insert holes formed therein to communicate with a respective one of the plurality of perforated holes.

In addition, the at least one bus bar frame may include:
 a body portion having a plate shape so that the at least one bus bar is mounted to an outer surface thereof and configured to extend in a direction along which the plurality of secondary batteries are stacked; and
 at least two fixing portions configured to protrusively extend outward from the body portion so as to be coupled to the flame-retardant sheet.

Further, the flame-retardant sheet may be inserted to be interposed between the at least two fixing portions.

Also, the flame-retardant sheet may further include a protrusion formed to protrude inward so that a portion of the protrusion is inserted into an insert hole of the plurality of insert holes of the at least one bus bar.

Moreover, each fixing portion of the at least two fixing portions may have a fixing hole in which an outer circumference of the flame-retardant sheet is inserted.

In addition, each fixing portion of the at least two fixing portions may have at least one fixing protrusion formed to press an outer circumference of the flame-retardant sheet inward so as to be fixed.

Further, the battery module may further comprise a pressing pin configured to press a portion of the flame-retardant sheet facing the insert hole of the at least one bus bar.

In another aspect of the present disclosure, there is also provided a battery rack, comprising at least one battery module.

In another aspect of the present disclosure, there is also provided an energy storage system, comprising at least one battery rack.

Advantageous Effects

According to an embodiment of the present disclosure, since the flame-retardant sheet having a plate shape is located in close contact with the outer side of the bus bar mounted to the bus bar frame to close the perforated hole formed in the bus bar frame, if a fire occurs at the cell assembly, it is possible to prevent oxygen from being supplied through the perforated hole of the bus bar assembly. Moreover, the flame-retardant sheet may prevent the flame generated by thermal runaway or fire of the cell assembly from exploding to other adjacent internal components.

Also, according to an embodiment of the present disclosure, since the flame-retardant sheet includes the ridged portion formed on the inner surface thereof facing the bus bar, having a shape ridged inward and shaped to surround the outer circumference of the welding hole, it is possible to prevent air from entering from the outside to the inside through the welding hole of the flame-retardant sheet.

In addition, according to an embodiment of the present disclosure, since the fixing portion has the fixing hole configured so that the outer circumference of the flame-retardant sheet is inserted therein, the flame-retardant sheet may be easily fixed to the bus bar frame. Moreover, after the flame-retardant sheet is inserted into the bus bar frame, it is possible to prevent the flame-retardant sheet from detaching from the bus bar frame even if an external impact is applied thereto. Accordingly, it is possible to increase the durability of the battery module.

Further, according to an embodiment of the present disclosure, since the present disclosure further includes the pressing pin configured to press a portion of the flame-retardant sheet facing the insert hole of the bus bar inward, at ordinary time, the pressing pin may bring the flame-retardant sheet into close contact with the bus bar so that the perforated hole of the bus bar frame is closed. Meanwhile, when a fire or thermal runaway occurs at the cell assembly, the pressing pin may flexibly allow a high-pressure gas ejected by internal pressure to be discharged through the perforated hole and the insert hole of the bus bar frame while pushing the flame-retardant sheet outward. Accordingly, it is possible to prevent an external air from being introduced into the cell assembly while discharging the high-temperature gas of the cell assembly, thereby preventing the fire or thermal runaway of the battery module from spreading to other neighboring cell assemblies.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
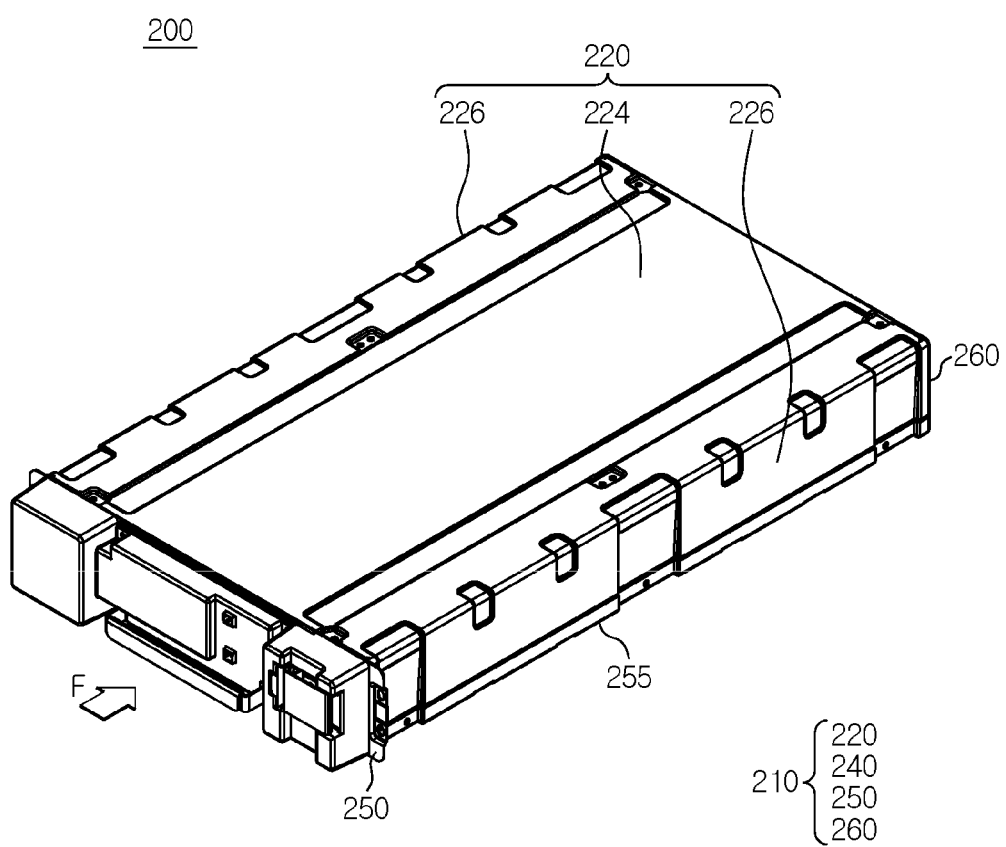
FIG. 1 is a perspective view schematically showing a battery module according to an embodiment of the present disclosure.
Figure 2:
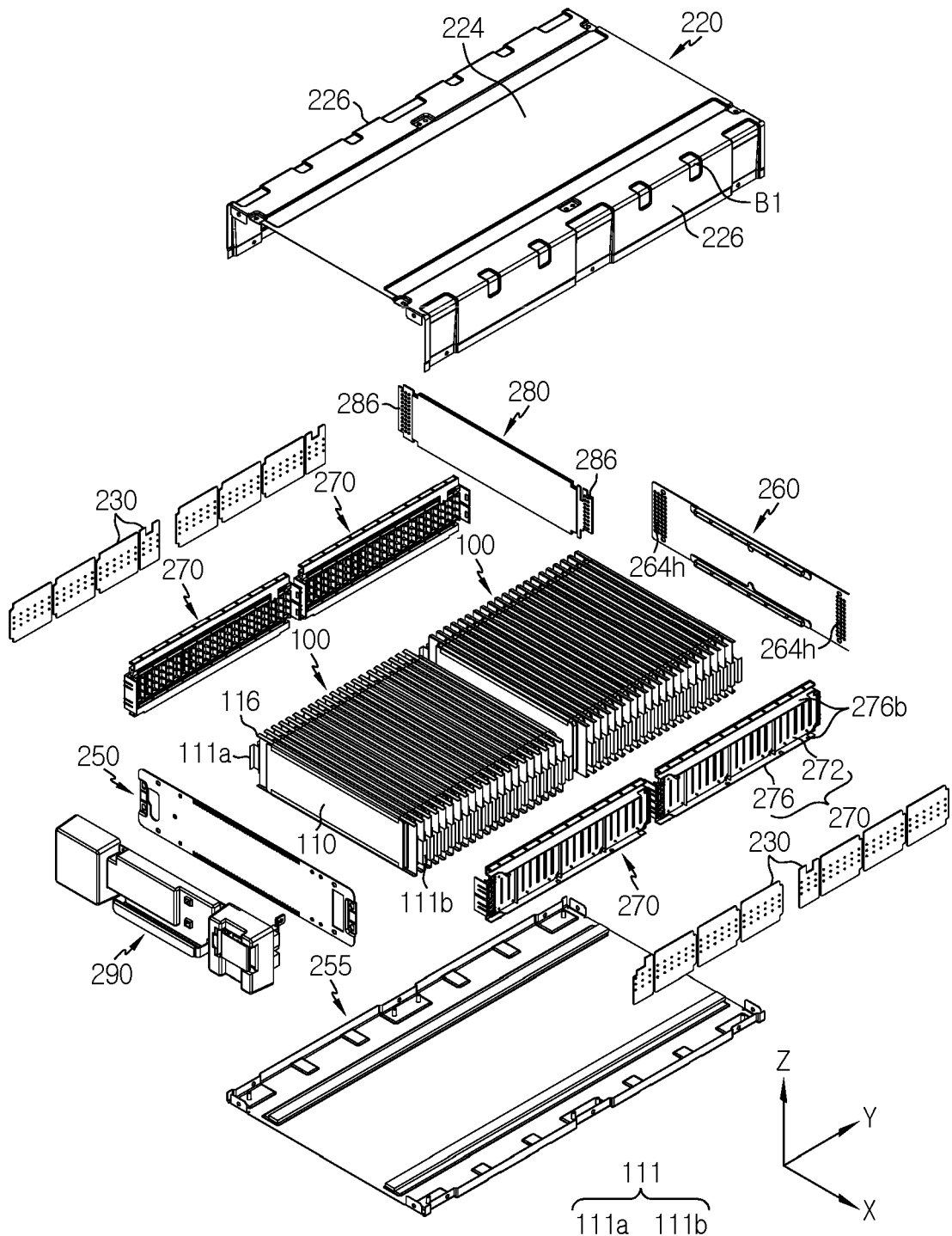
FIG. 2 is an exploded perspective view schematically showing components of the battery module according to an embodiment of the present disclosure.
Figure 3:
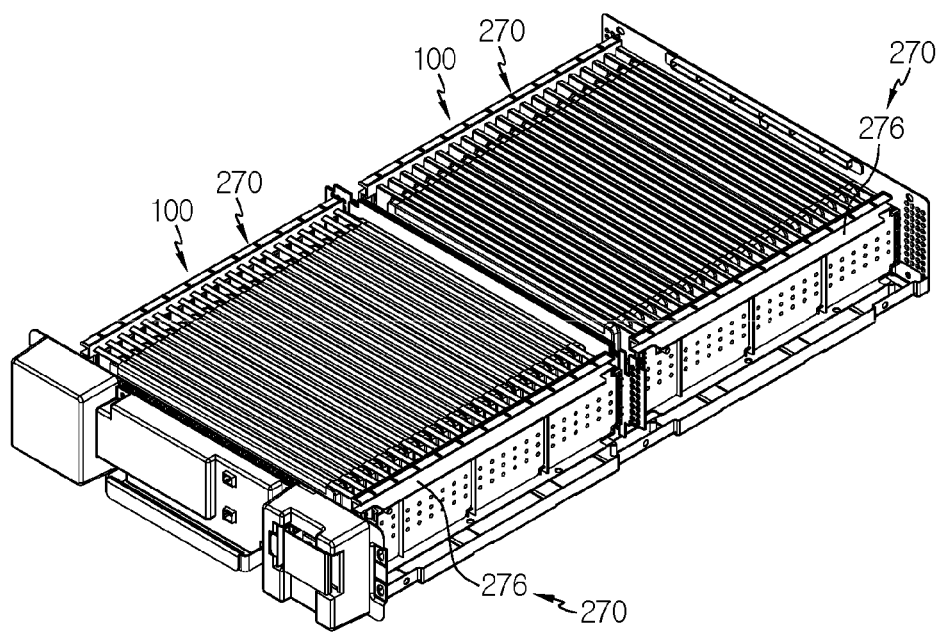
FIG. 3 is a perspective view schematically showing components of the battery module according to an embodiment of the present disclosure.

FIG. 1 is a perspective view schematically showing a battery module according to an embodiment of the present disclosure. FIG. 2 is an exploded perspective view schematically showing components of the battery module according to an embodiment of the present disclosure. Also, FIG. 3 is a perspective view schematically showing components of the battery module according to an embodiment of the present disclosure. In FIG. 3, in order to show the inside of a battery module 200, the battery module 200 is depicted in a state where an upper cover 220 of a module housing 210 is excluded. In addition, in FIG. 2, a positive direction of an X-axis arrow refers to a right direction, a negative direction thereof refers to a left direction, a positive direction of a Y-axis arrow refers to a rear direction, a negative direction thereof refers to a front direction, and a positive direction of a Z-axis direction refers to an upper direction, and a negative direction thereof refers to a lower direction.

Referring to FIGS. 1 to 3, the battery module 200 according to an embodiment of the present disclosure may include a cell assembly 100, a module housing 210, and a flame-retardant sheet 230.

Here, the cell assembly 100 may include a plurality of secondary batteries 110 stacked on each other in a front and rear direction. The secondary battery 110 may be a pouch-type secondary battery 110. For example, as shown in FIG. 2, each of the two cell assemblies 100 may be configured so that 21 pouch-type secondary batteries 110 are stacked side by side in a front and rear direction (Y direction).

In particular, the pouch-type secondary battery 110 may include an electrode assembly (not shown), an electrolyte (not shown), and a pouch 116.

When viewed in the F direction (shown in FIG. 1), the secondary batteries 110 may be disposed to be erected approximately perpendicular to the ground (Z direction) so that two wide sides thereof are respectively positioned at front and rear sides and sealing portions are positioned at upper, lower, left and right sides. In other words, each secondary battery 110 may be configured to be erected in a vertical direction. Meanwhile, in this specification, unless otherwise specified, the upper, lower, front, rear, left and right directions will be set based on when viewed in the F direction.

Here, the pouch 116 may be configured as a pouch having an accommodation portion with a concave shape. In addition, the electrode assembly and the electrolyte may be accommodated in the accommodation portion. Also, each pouch may include an outer insulating layer, a metal layer and an inner adhesive layer, and the inner adhesive layers may be bonded to each other at an edge of the pouch to form a sealing portion. Further, a terrace portion may be formed at each end of the secondary battery 110 in a left and right direction (X direction) where a positive electrode lead 111a and a negative electrode lead 111b are formed.

In addition, the electrode assembly is an assembly of an electrode plate coated with an electrode active material and a separator, and may be configured so that at least one positive electrode plate and at least one negative electrode plate are disposed with the separator being interposed therebetween. In addition, a positive electrode tab may be provided at the positive electrode plate of the electrode assembly, and at least one positive electrode tab may be connected to the positive electrode lead 111a.

Here, the positive electrode lead 111a may have one end connected to the positive electrode tab and the other end exposed out of the pouch 116, and the exposed portion may serve as an electrode lead of the secondary battery 110, for example a positive electrode terminal of the secondary battery 110.

In addition, a negative electrode tab is provided at the negative electrode plate of the electrode assembly, and at least one negative electrode tab may be connected to the negative electrode lead 111b. In addition, the negative electrode lead 111b may have one end connected to the negative electrode tab and the other end exposed out of the pouch, and the exposed portion may serve as an electrode lead of the secondary battery 110, for example a negative electrode terminal of the secondary battery 110.

Moreover, as shown in FIG. 1, when viewed directly in the F direction, the positive electrode lead 111a and the negative electrode lead 111b may be formed at the left and right ends in opposite directions (X direction) with respect to the center of the secondary battery 110. That is, the positive electrode lead 111a may be provided at one end (left end) based on the center of the secondary battery 110. In addition, the negative electrode lead 111b may be provided at the other end (right end) based on the center of the secondary battery 110.

For example, as shown in FIG. 2, each secondary battery 110 of the cell assembly 100 may be configured such that the positive electrode lead 111a and the negative electrode lead 111b protrude in the left and right direction.

Here, terms representing directions such as 'front', after, left, right, up, and down may vary depending on the position of the observer or the shape of the object. However, in the present specification, for convenience of description, directions such as front, rear, left, right, up, and down are shown separately based on when viewed in the F direction.

Here, terms indicating directions such as 'front', 'rear', 'left', 'right', 'upper' and 'lower' used in this specification may vary depending on the position of an observer or the form of a placed object. However, in this specification, for convenience of explanation, the directions such as 'front', 'rear', 'left', 'right', 'upper' and 'lower' are distinguishably expressed based on the case of being viewed in the F direction.

Therefore, according to this configuration of the present disclosure, in one secondary battery 110, there is no interference between the positive electrode lead 111a and the negative electrode lead 111b, so it is possible to increase the area of the electrode lead 111.

In addition, the positive electrode lead 111a and the negative electrode lead 111b may be configured in a plate shape. In particular, the positive electrode lead 111a and the negative electrode lead 111b may protrude in a horizontal direction (X direction) in a state where wide sides thereof are erected toward the front and rear direction.

Here, the horizontal direction may refer to a direction parallel to the ground when the secondary battery 110 is placed on the ground, and may also refer to at least one direction on a plane perpendicular to the vertical direction.

However, the battery module 200 according to the present disclosure is not limited to the pouch-type secondary battery 110 described above, and various kinds of secondary batteries 110 known at the time of filing of this application may be employed.

In addition, the at least two or more cell assemblies 100 may be arranged in the front and rear direction. For example, as shown in FIG. 2, two cell assemblies 100 may be arranged in the front and rear direction, and the two cell assemblies 100 may be spaced apart from each other by a predetermined distance.

Meanwhile, the module housing 210 may have an inner space to accommodate the cell assembly 100 therein. Specifically, the module housing 210 may include an upper cover 220, a base plate 255, a front cover 250, and a rear cover 260.

Specifically, the base plate 255 may have an area larger than the size of a bottom surface of the at least two cell assemblies 100 so as to mount the at least two cell assemblies 100 to an upper portion thereof. The base plate 255 may have a plate shape extending in a horizontal direction.

In addition, the upper cover 220 may include a top portion 224 and a side portion 226. The top portion 224 may have a plate shape extending in a horizontal direction to cover an upper portion of the cell assembly 100. The side portion 226 may have a plate shape extending downward from both left and right ends of the top portion 224 to cover both left and right sides of the cell assembly 100.

In addition, the side portion 226 may be coupled to a portion of the base plate 255. For example, as shown in FIG. 2, the upper cover 220 may include a top portion 224 having a plate shape extending in the front, rear, left and right directions. The upper cover 220 may include two side portions 226 extending downward from both left and right ends of the top portion 224, respectively. Further, lower ends of the two side portions 226 may be configured to be coupled with both left and right ends of the base plate 255, respectively. In this case, the coupling method may be a male and female coupling method or a welding method.

Further, the side portion 226 may have a beading portion B1 protruding inward toward the secondary battery 110. For example, as shown in FIG. 2, eight beading portions B1 protruding inward may be formed on one side portion 226.

Moreover, the front cover 250 may be configured to cover the front side of the plurality of secondary batteries 110. For example, the front cover 250 may have a plate shape larger than the size of the front surface of the plurality of secondary batteries 110. The plate shape may be erected in a vertical direction.

Further, a portion of the outer circumference of the front cover 250 may be coupled with the base plate 255. For example, a lower portion of the outer circumference of the front cover 250 may be coupled to a front end of the base plate 255. Further, an upper portion of the outer circumference of the front cover 250 may be coupled to a front end of the upper cover 220. Here, the coupling method may employ bolting.

In addition, the rear cover 260 may be configured to cover the rear side of the cell assembly 100. For example, the rear cover 260 may have a plate shape larger than the size of the rear surface of the plurality of secondary batteries 110.

In addition, a portion of the outer circumference of the rear cover 260 may be coupled with the base plate 255. For example, a lower portion of the outer circumference of the rear cover 260 may be coupled to the front end of the base plate 255. Further, an upper portion of the outer circumference of the rear cover 260 may be coupled to the rear end of the upper cover 220. Here, the coupling method may employ bolting. The rear cover 260 may have a discharge hole 264h formed to allow an external air to flow to the inside or to allow an internal air to flow to the outside.

Therefore, according to this configuration of the present disclosure, since the module housing 210 has a structure capable of stably protecting the plurality of secondary batteries 110 from external shocks, it is possible to increase the safety of the battery module 200 against external shocks.

Meanwhile, the battery module 200 of the present disclosure may further include a module BMS 290 configured to control charging and discharging of the cell assembly 100. The module BMS 290 may include various sensors and electric circuits to sense the temperature and current of the battery module 200. The sensors and circuits are not shown in the figures.

In addition, the battery module 200 of the present disclosure may include a flame-retardant sheet 280. The flame-retardant sheet may be located between the two cell assemblies 100. The flame-retardant sheet 280 may have openings 286 formed at both left and right sides thereof so that air may pass therethrough.

Meanwhile, the bus bar assembly 270 may include at least one bus bar 272 and at least one bus bar frame 276 to which the bus bar 272 is mounted.

Specifically, the bus bar 272 may be an alloy containing a metal such as copper, nickel or aluminum with excellent electrical conductivity. The bus bar 272 may be configured to electrically connect the plurality of secondary batteries 110 to each other. That is, the bus bar 272 may be configured to contact a portion of the electrode lead 111. The bus bar 272 may have a plate shape. For example, as shown in FIG. 2, the bus bar 272 may have a plate shape extending in front and rear directions and in upper and lower directions.

In addition, the bus bar frame 276 may include an electrically insulating material. For example, the bus bar frame 276 may have a plastic material. More specifically, the plastic material may be polycarbonate, polyvinyl chloride, or the like.

For example, as shown in FIG. 2, the battery module 200 may include four bus bar assemblies 270. The bus bar assemblies 270 may be located on the left and right sides of the cell assembly 100, respectively. Each of the four bus bar assemblies 270 may include four bus bars 272 and a bus bar frame 276 configured so that the four bus bars 272 are mounted to an outer surface thereof.

Figure 4:
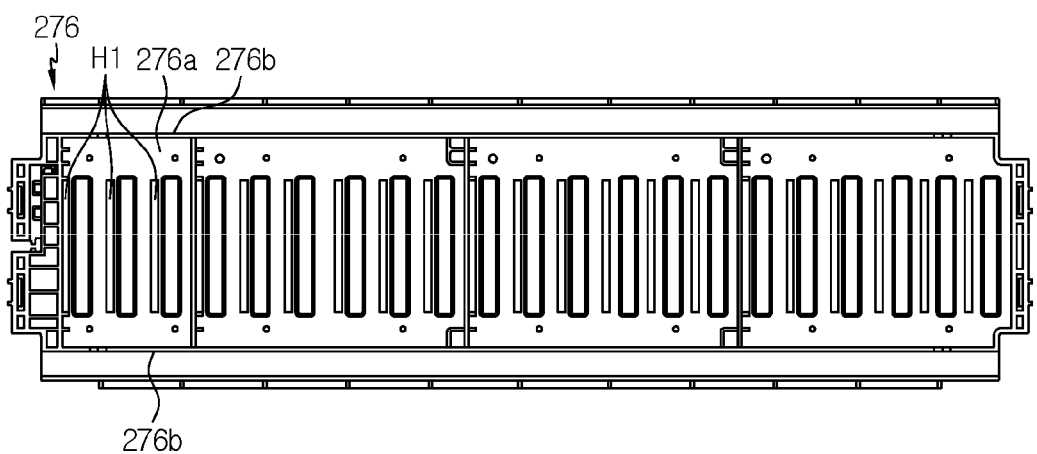
FIG. 4 is a side view schematically showing a bus bar frame, employed at the battery module according to an embodiment of the present disclosure.

FIG. 4 is a side view schematically showing a bus bar frame, employed at the battery module according to an embodiment of the present disclosure. Also, FIG. 5 is a partial side view schematically showing an inner side surface of the battery module of FIG. 3.

Figure 5:
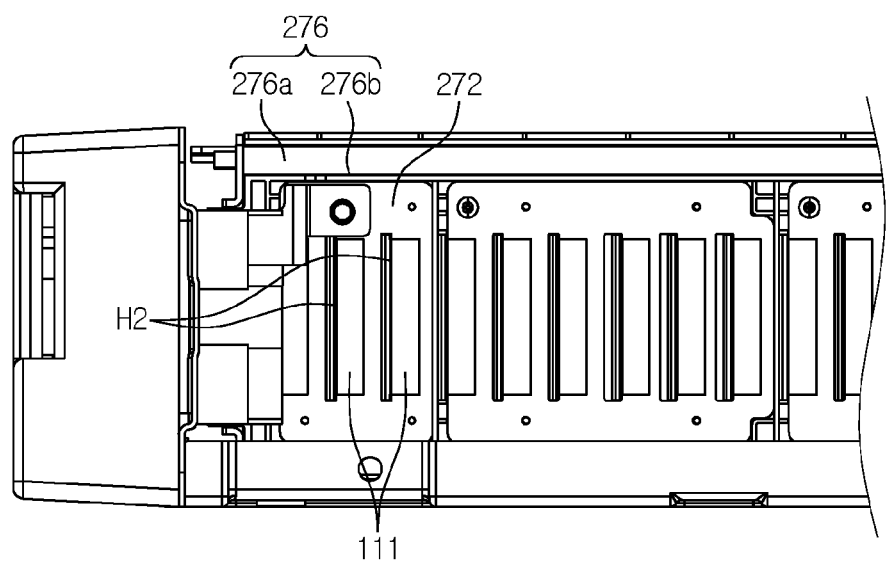
FIG. 5 is a partial side view schematically showing an inner side surface of the battery module of FIG. 3.

Referring to FIGS. 4 and 5 along with FIG. 2, the bus bar frame 276 may include a body portion 276a and at least two fixing portions 276b. The body portion 276a may have a plate shape so that the at least one bus bar 272 is mounted to an outer surface thereof. The body portion 276a may be erected in a vertical direction. The body portion 276a may be elongated in a direction along which the plurality of secondary batteries 110 are stacked (the front and rear direction).

In addition, the fixing portion 276b may have a shape protrusively extending outward from the body portion 276a. The fixing portions 276b may have a shape protrusively extending outward from an upper portion and a lower portion of the outer surface of the body portion 276a.

Moreover, the fixing portion 276b may be configured to be coupled to the flame-retardant sheet 230. For example, the flame-retardant sheet 230 may be configured to be interposed between two fixing portions 276b. For example, the flame-retardant sheet 230 may be inserted between the fixing portion 276b formed at the upper portion of the body portion 276a and the fixing portion 276b formed at the lower portion and assembled thereto by fitting.

In addition, the bus bar frame 276 of the battery module 200 of the present disclosure may have a plurality of perforated holes H1 through which the electrode leads 111 of the plurality of secondary batteries 110 passes. As shown in FIG. 4, the bus bar frame 276 may have the perforated holes H1 respectively formed at positions corresponding to the electrode leads 111 of the plurality of secondary batteries 110. Accordingly, each electrode lead 111 of the plurality of secondary batteries 110 of the cell assembly 100 may be configured to protrude outward through the perforated hole H1 of the bus bar frame 276. The perforated hole H1 may have a shape similar to the electrode lead 111. For example, the perforated hole H1 may have a rectangular hole elongated in the vertical direction.

Moreover, the bus bar 272 may have an insert hole H2 configured to communicate with the perforated hole H1. The insert hole H2 may be configured such that the electrode lead 111 of the secondary battery 110 is inserted therein. For example, referring to FIG. 5, five insert holes H2 may be formed in any one bus bar 272. The electrode lead 111 of the secondary battery 110 may be inserted into each of the five insert holes H2, and the inserted portion may be bent in the front and rear direction to contact (be welded to) the outer surface of the bus bar 272.

Moreover, the flame-retardant sheet 230 may have a flame-retardant material that does not burn easily. For example, the flame-retardant material may be mica, vinyl chloride resin containing chlorine, paraffin chloride, decabromodiphenyl oxide, antimony trioxide, or the like.

In addition, the flame-retardant sheet 230 may have a plate shape. That is, the flame-retardant sheet 230 may have a sheet shape extending in the front and rear direction and in the upper and lower direction. Moreover, the flame-retardant sheet 230 may be configured to close the perforated hole H1. The flame-retardant sheet 230 may be positioned in close contact with the outer side of the bus bar 272. That is, the flame-retardant sheet 230 may be fixed at a position facing the perforated hole H1 of the bus bar frame 276.

Therefore, according to this configuration of the present disclosure, since the flame-retardant sheet 230 having a plate shape is located in close contact with the outer side of the bus bar 272 mounted to the bus bar frame 276 to close the perforated hole H1 formed in the bus bar frame 276, if a fire occurs at the cell assembly 100, it is possible to prevent oxygen from being supplied through the perforated hole H1 of the bus bar assembly 270. Moreover, the flame-retardant sheet 230 may prevent the flame generated by thermal runaway or fire of the cell assembly 100 from exploding to other adjacent internal components.

Figure 6:
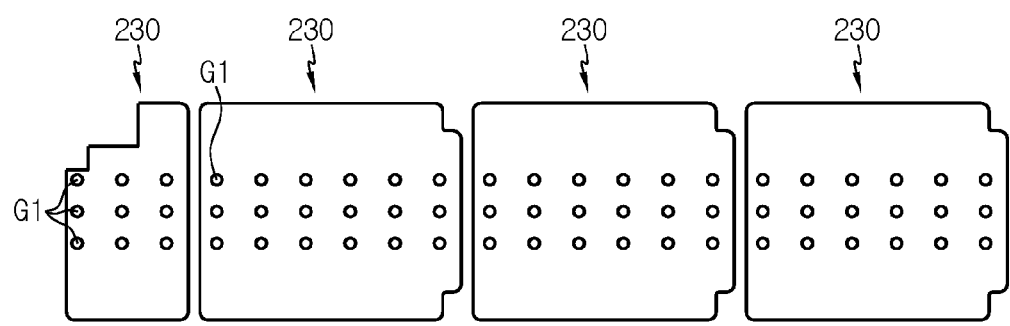
FIG. 6 is a right side view schematically showing flame-retardant sheets, employed at the battery module according to an embodiment of the present disclosure.

FIG. 6 is a right side view schematically showing flame-retardant sheets, employed at the battery module according to an embodiment of the present disclosure.

Referring to FIG. 6 along with FIG. 5, the flame-retardant sheet 230 may have a plurality of welding holes G1 formed there. The welding hole G1 may be formed by perforating a portion of the flame-retardant sheet 230 so that a portion of the electrode lead 111 in contact with the bus bar 272 may be exposed to the outside. The plurality of welding holes G1 may be formed at positions corresponding to the welding portions of the electrode leads 111 and the bus bar 272. For example, as shown in FIG. 6, the plurality of welding holes G1 may be formed in each of the four flame-retardant sheets 230 so that a portion of the electrode leads 111 in contact with the bus bar 272 is exposed to the outside.

Therefore, according to this configuration of the present disclosure, since the flame-retardant sheet 230 have a plurality of welding holes G1 perforated so that a portion of the electrode lead 111 in contact with the bus bar 272 is exposed to the outside, even if the flame-retardant sheet 230 is positioned on the bus bar 272 of the bus bar assembly 270, the contact portion of the bus bar 272 and the electrode lead 111 may be welded through the plurality of welding holes G1. Accordingly, it is possible to prevent the manufacturing efficiency from deteriorating due to the flame-retardant sheet 230.

Figure 7:
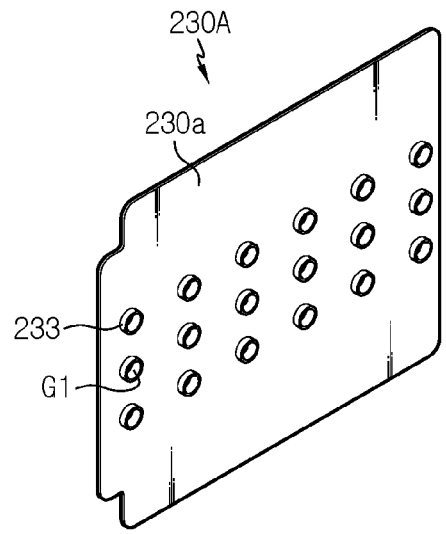
FIG. 7 is a perspective view schematically showing a flame-retardant sheet, employed at a battery module according to another embodiment of the present disclosure.

FIG. 7 is a perspective view schematically showing a flame-retardant sheet, employed at a battery module according to another embodiment of the present disclosure.

Referring to FIG. 7 along with FIG. 5, a flame-retardant sheet 230A of a battery module according to another embodiment may further include a ridged portion 233 on the inner surface 230a as compared to the flame-retardant sheet 230 of FIG. 6. Specifically, the ridged portion 233 may be formed on the inner surface of the flame-retardant sheet 230A. The ridged portion 233 may have a shape protruding inward. For example, the ridged portion 233 may be configured to be in close contact with the outer surface of the bus bar 272. The ridged portion 233 may have a shape surrounding the outer circumference of the welding hole G1.

For example, as shown in FIG. 7, 18 welding holes G1 may be formed in the flame-retardant sheet 230A. The ridged portion 233 may be formed at each of the 18 welding holes G1. The ridged portion 233 may protrude inward and be in close contact with the outer surface of the bus bar 272 in order to prevent a gap from being created between the flame-retardant sheet 230A and the bus bar 272.

Therefore, according to this configuration of the present disclosure, since the flame-retardant sheet 230A includes the ridged portion 233 formed on the inner surface thereof facing the bus bar 272, having a shape ridged inward and shaped to surround the outer circumference of the welding hole G1, it is possible to prevent air from entering from the outside to the inside through the welding hole G1 of the flame-retardant sheet 230A.

Figure 8:
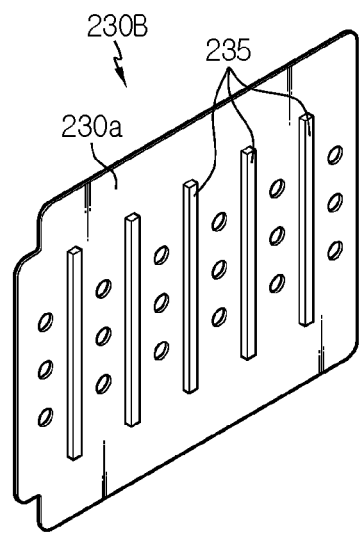
FIG. 8 is a perspective view schematically showing a flame-retardant sheet, employed at a battery module according to another embodiment of the present disclosure.

FIG. 8 is a perspective view schematically showing a flame-retardant sheet, employed at a battery module according to another embodiment of the present disclosure.

Referring to FIG. 8 along with FIG. 5, a flame-retardant sheet 230B of a battery module according to another embodiment may further include a protrusion 235 on the inner surface 230A as compared to the flame-retardant sheet 230 of FIG. 6. Specifically, the protrusion 235 may have a shape protruding inward to a predetermined length so that a portion of the protrusion 235 is inserted into the insert hole H2 of the bus bar 272. For example, as shown in FIG. 8, the flame-retardant sheet 230B may have with five protrusions 235. The protrusion 235 may be formed at a position corresponding to the perforated hole H1 (FIG. 4) of the bus bar frame 276. In addition, the protrusion 235 may be configured to be inserted into the insert hole H2 (FIG. 5) of the bus bar 272.

Therefore, according to this configuration of the present disclosure, since the flame-retardant sheet 230B includes the protrusion 235 protruding inward so that a portion thereof is inserted into the insert hole H2 of the bus bar 272, it is possible to prevent air from being introduced from the outside to the inside through insert hole H2 communicating with the perforated hole H1. Accordingly, the battery module of the present disclosure may block air inflow to the inside even if a fire or thermal runaway occurs at the cell assembly 100 (FIG. 2), thereby preventing fire or thermal runaway from spreading to other neighboring cell assemblies 100 (FIG. 2).

Figure 9:
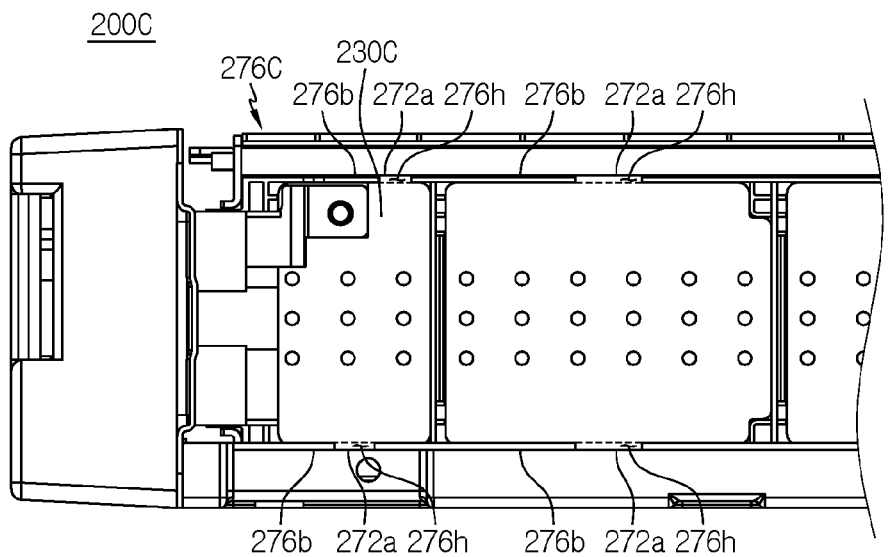
FIG. 9 is a partial side view schematically showing a side surface of a battery module according to still another embodiment of the present disclosure.

FIG. 9 is a partial side view schematically showing a side surface of a battery module according to still another embodiment of the present disclosure.

Referring to FIG. 9, a bus bar frame 276C of a battery module 200C according to still another embodiment may have a fixing hole 276h formed in the fixing portion 276b.

The fixing hole 276h may be configured such that a portion 272a of the outer circumference of the flame-retardant sheet 230C is inserted therein. For example, as shown in FIG. 9, the fixing portion 276b protruding outward from the body portion 276a may be provided in the bus bar frame 276C. In a part of the fixing portion 276b, the fixing hole 276h may be formed to be perforated in the vertical direction. An upper portion 272a of the outer circumference of the flame-retardant sheet 230C may have a shape protruding upward so as to be inserted into the fixing hole 276h. Upper and lower portions 272a of the outer circumference of the flame-retardant sheet 230C may have a shape protruding downward so as to be inserted into the fixing hole 276h formed in the fixing portion 276b located below.

Therefore, according to this configuration of the present disclosure, since the fixing portion 276b has the fixing hole 276h configured so that the outer circumference of the flame-retardant sheet 230C is inserted therein, the flame-retardant sheet 230C may be easily fixed to the bus bar frame 276C. Moreover, after the flame-retardant sheet 230C is inserted into the bus bar frame 276C, it is possible to prevent the flame-retardant sheet 230C from detaching from the bus bar frame 276C even if an external impact is applied thereto. Accordingly, it is possible to increase the durability of the battery module 200C.

Figure 10:
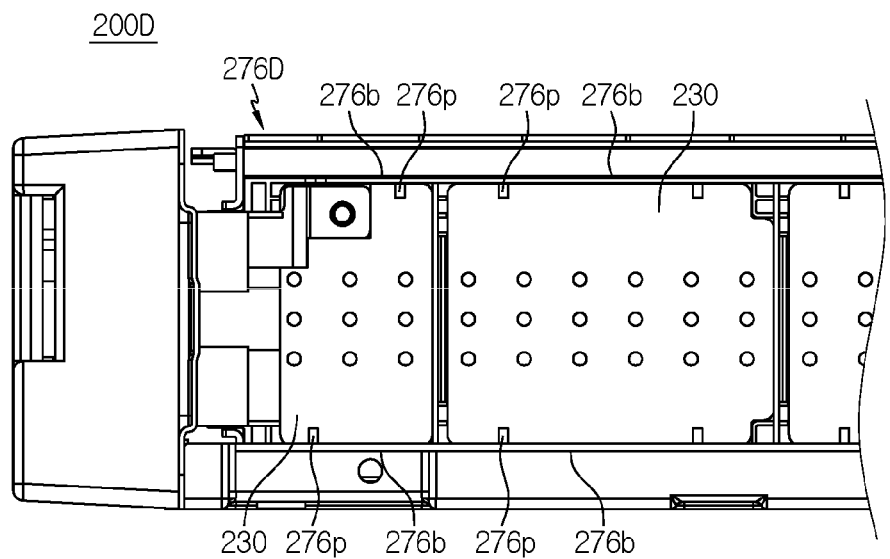
FIG. 10 is a partial side view schematically showing a side surface of a battery module according to still another embodiment of the present disclosure.

FIG. 10 is a partial side view schematically showing a side surface of a battery module according to still another embodiment of the present disclosure.

Referring to FIG. 10, a bus bar frame 276D of a battery module 200D according to still another embodiment may further include at least one fixing protrusion 276p formed on the fixing portion 276b. The fixing protrusion 276p may be configured to press the outer circumference of the flame-retardant sheet 230 inward to be fixed. That is, the fixing protrusion 276p may have a shape extending from the fixing portion 276b to contact the outer surface of the flame-retardant sheet 230 so as to press the outer surface of the flame-retardant sheet 230 inward.

For example, as shown in FIG. 10, the fixing protrusion 276p may be formed on each of the two fixing portions 276b of the bus bar frame 276. The fixing protrusion 276p protruding downward may be formed on the fixing portion 276b located at an upper part of the bus bar frame 276. The fixing protrusion 276p protruding upward may be formed on the fixing portion 276b located at a lower part of the bus bar frame 276. The fixing protrusion 276p formed on the fixing portion 276b may be configured to press the outer circumference of the flame-retardant sheet 230 inward.

Therefore, according to this configuration of the present disclosure, since the fixing portion 276b has at least one fixing protrusion 276p configured to press and fix the outer circumference of the flame-retardant sheet 230 inward, the flame-retardant sheet 230 may be easily fixed to the bus bar frame 276. Moreover, after the flame-retardant sheet 230 is inserted into the bus bar frame 276, it is possible to prevent the flame-retardant sheet 230 from detaching from the bus bar frame 276 even if an external impact is applied thereto. Accordingly, it is possible to increase the durability of the battery module 200D.

Figure 11:
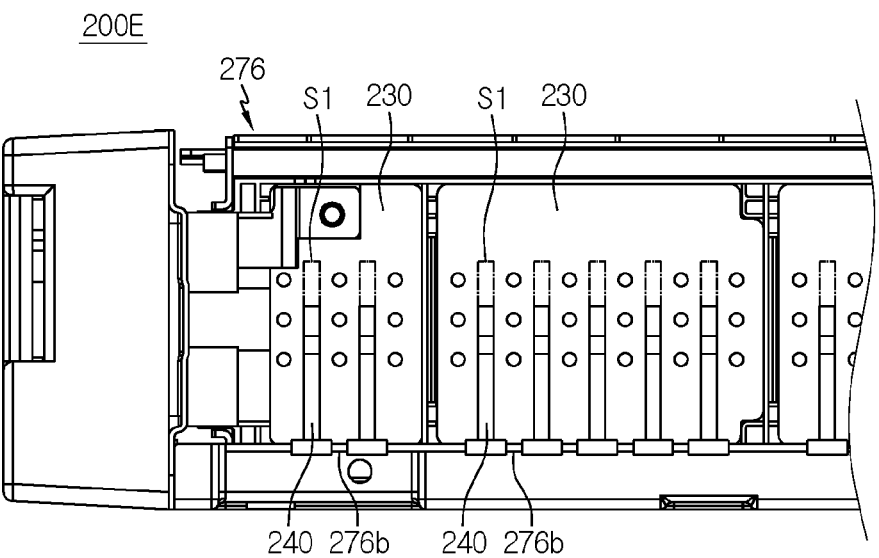
FIG. 11 is a partial side view schematically showing a side surface of a battery module according to still another embodiment of the present disclosure.

FIG. 11 is a partial side view schematically showing a side surface of a battery module according to still another embodiment of the present disclosure. Also, FIG. 12 is a perspective view schematically showing a pressing pin, employed at the battery module of FIG. 11.

Figure 12:
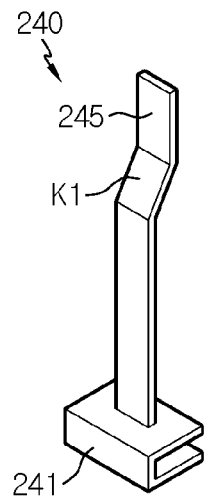
FIG. 12 is a perspective view schematically showing a pressing pin, employed at the battery module of FIG. 11.

Referring to FIGS. 11 and 12 together with FIG. 5, a battery module 200E according to another exemplary embodiment may further include a pressing pin 240 as compared to the battery module 200 of FIG. 6. Specifically, the pressing pin 240 may be configured to press a portion S1 of the flame-retardant sheet 230 facing the insert hole H2 of the bus bar 272. For example, one flame-retardant sheet 230 may have five portions S1 of the flame-retardant sheet 230 facing the insert hole H2 of the bus bar 272. Each of the five pressing pins 240 may press a portion of the flame-retardant sheet 230 facing the insert hole H2 of the bus bar 272 inward.

In addition, the pressing pin 240 may include a pressing portion 245 and a connecting portion 241. The connecting portion 241 may be configured to be fitted into an end of the fixing portion 276b formed at the bus bar frame 276. For example, the connecting portion 241 may have a clip shape. The pressing portion 245 may be a portion extending from the connecting portion 241 to a portion of the flame-retardant sheet 230 facing the insert hole H2 of the bus bar 272. The pressing portion 245 may elastically press the outer surface of the flame-retardant sheet 230 inward. To this end, the pressing portion 245 may have a structure K1 bent in at least one direction.

Therefore, according to this configuration of the present disclosure, since the present disclosure further includes the pressing pin 240 configured to press a portion of the flame-retardant sheet 230 facing the insert hole H2 of the bus bar 272 inward, at ordinary time, the pressing pin 240 may bring the flame-retardant sheet 230 into close contact with the bus bar 272 so that the perforated hole H1 of the bus bar frame 276 is closed. Meanwhile, when a fire or thermal runaway occurs at the cell assembly 100, the pressing pin 240 may flexibly allow a high-pressure gas ejected by internal pressure to be discharged through the perforated hole H1 and the insert hole H2 of the bus bar frame 276 while pushing the flame-retardant sheet 230 outward. Accordingly, it is possible to prevent an external air from being introduced into the cell assembly 100 while discharging the high-temperature gas of the cell assembly 100, thereby preventing the fire or thermal runaway of the battery module 200E from spreading to other neighboring cell assemblies 100.

Figure 13:
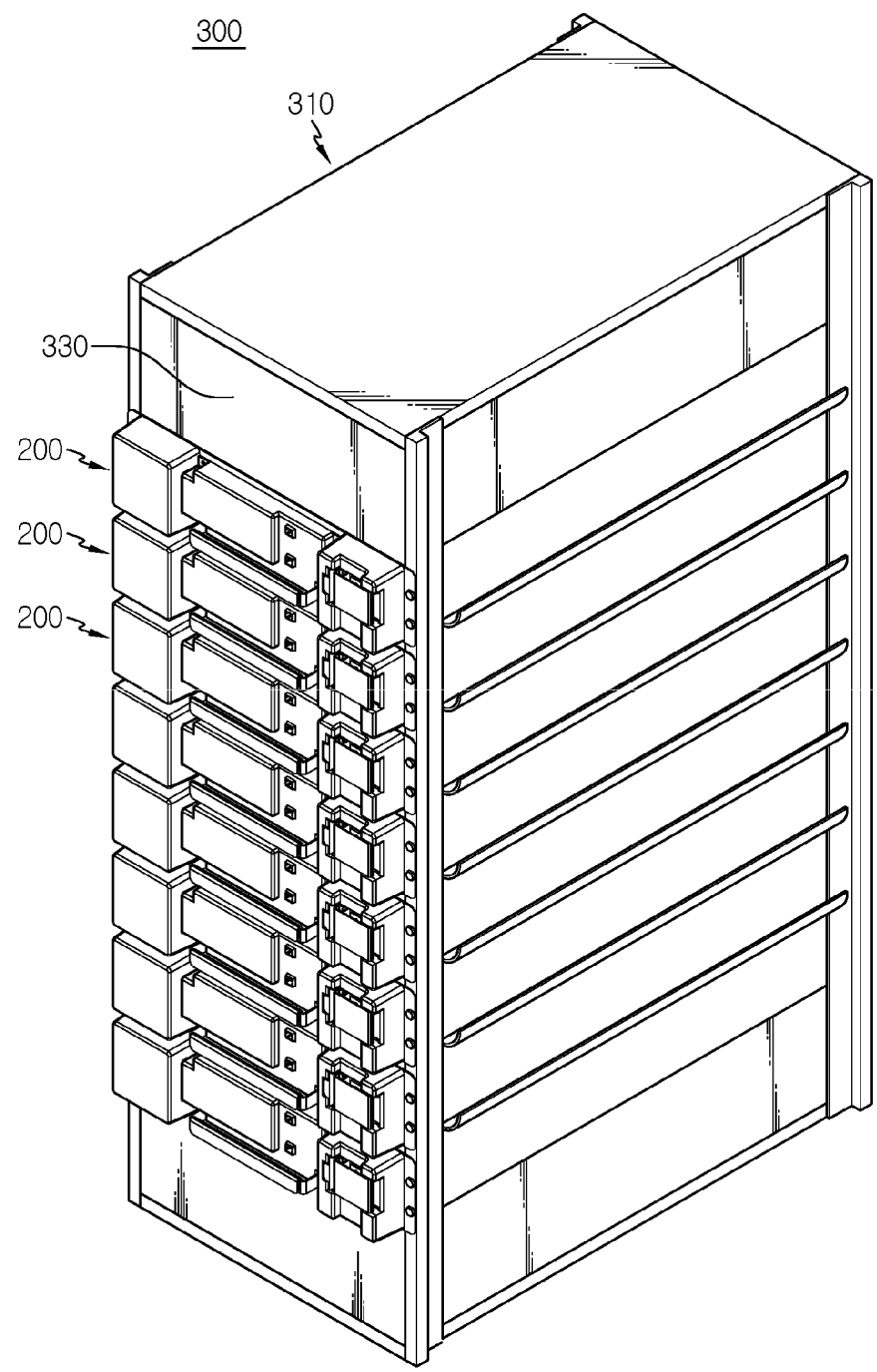
FIG. 13 is a perspective view schematically showing an energy storage system according to an embodiment of the present disclosure.

FIG. 13 is a perspective view schematically showing an energy storage system according to an embodiment of the present disclosure.

Referring to FIG. 13 along with FIG. 2, a battery rack 300 according to the present disclosure may further include a rack BMS (Battery Management System) 330 provided inside or outside a rack case 310 to exchange information with the plurality of module BMS 290.

An energy storage system according to the present disclosure may include at least one battery rack 300 according to the present disclosure. In particular, the energy storage system may include a plurality of battery racks 300 according to the present disclosure. In addition, the plurality of battery racks 300 may be electrically connected to each other. The energy storage system according to the present disclosure may be implemented in various forms such as a smart grid system or an electric charging station.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | |
|---|---|
| 200: battery module | 100: cell assembly |
| 110: secondary battery | 210: module housing |
| 270: bus bar assembly | |
| 272, 276: bus bar, bus bar frame | |
| H1: perforated hole | H2: insert hole |
| 276a: body portion | 276b: fixing portion |
| 276h: fixing hole | 276p: fixing protrusion |
| 230: flame-retardant sheet | |
| G1: welding hole | 233: ridged portion |
| 235: protrusion | 240: pressing pin |
| 300: battery rack | 310: rack case |

What is claimed is:

1. A battery module, comprising:
at least one cell assembly including a plurality of secondary batteries, each secondary battery of the plurality of secondary batteries having an electrode lead;
a module housing having an inner space formed to accommodate the cell assembly;
a bus bar assembly including at least one electrically conductive bus bar having a plate shape and configured to contact a portion of the electrode leads, and at least one electrically insulating bus bar frame to which the at least one bus bar is mounted, the at least one bus bar having a plurality of perforated holes through which the electrode leads of the plurality of secondary batteries passes; and
a flame-retardant sheet having a plate shape and located in contact with an outer side of the at least one bus bar to close the plurality of perforated holes,
wherein the flame-retardant sheet has a plurality of welding holes through which a portion of the electrode leads in contact with the at least one bus bar is exposed to the outside, and
wherein the flame-retardant sheet has a plurality of ridged portions formed on an inner surface thereof facing the at least one bus bar to be ridged inward, the plurality of ridged portions being shaped to surround an outer circumference of a respective one of the plurality of welding holes.

2. The battery module according to claim 1, wherein the plurality of secondary batteries are stacked on each other in a front and rear direction and configured to include the electrode leads respectively located at a left end and a right end thereof,
wherein the bus bar assembly is provided at a left side and a right side of the cell assembly, respectively,
wherein the at least one bus bar has a plurality of insert holes formed therein to communicate with a respective one of the plurality of perforated holes,
wherein the at least one bus bar frame includes:
a body portion having a plate shape so that the at least one bus bar is mounted to an outer surface thereof and configured to extend in a direction along which the plurality of secondary batteries are stacked; and
at least two fixing portions configured to protrusively extend outward from the body portion so as to be coupled to the flame-retardant sheet,
the flame-retardant sheet is inserted to be interposed between the at least two fixing portions.

3. The battery module according to claim 2, wherein the flame-retardant sheet further includes a protrusion formed to protrude inward so that a portion of the protrusion is inserted into an insert hole of the plurality of insert holes of the at least one bus bar.

4. The battery module according to claim 3, wherein each fixing portion of the at least two fixing portions has a fixing hole in which an outer circumference of the flame-retardant sheet is inserted.

5. The battery module according to claim 3, wherein each fixing portion of the at least two fixing portions has at least one fixing protrusion extending into a space between the at least two fixing portions formed to press an outer circumference of the flame-retardant sheet inward so as to be fixed.

6. The battery module according to claim 3, further comprising:
a pressing pin configured to press a portion of the flame-retardant sheet facing the insert hole of the at least one bus bar, the pressing pin having one end attach to a fixing portion of the at least two fixing portions and extending into a space between the at least two fixing portions.

7. A battery rack, comprising at least one battery module according to claim 1.

8. An energy storage system, comprising at least one battery rack according to claim 7.

* * * * *